F. J. Goldsmith,
Feed Trough.
No. 111,529. Patented Feb. 7, 1871.
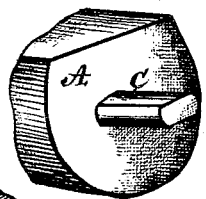
Fig. IV.
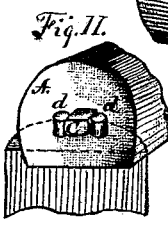
Fig. II.
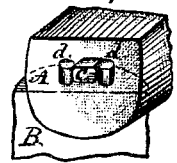
Fig. III.
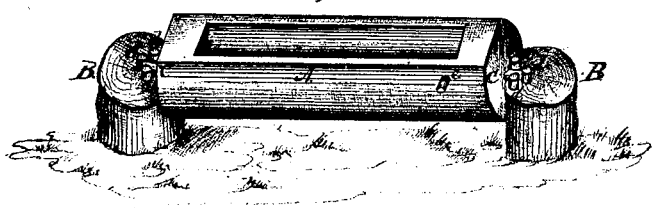
Fig. I.
Witnesses.
William Pettingell
John W. Tifler

United States Patent Office.

FRANCIS J. GOLDSMITH, OF CONCORD, ASSIGNOR OF ONE-HALF HIS RIGHT TO PETER F. YOUNG, OF PAINESVILLE, OHIO.

Letters Patent No. 111,529, dated February 7, 1871.

IMPROVEMENT IN INVERTIBLE TROUGHS.

The Schedule referred to in these Letters Patent and making part of the same.

I, FRANCIS J. GOLDSMITH, of Concord, in the county of Lake and State of Ohio, have invented certain Improvements in Invertible Troughs, of which the following is a specification.

Nature and Objects of my Invention.

My invention relates to an improvement in invertible troughs, aiming at economy and simplicity of construction.

The journals C that suspend the trough are flattened on the lower bearing surface, which keeps the trough from revolving when it is full of water or other contents; the upper surface of the journals are also flattened, to retain the trough in an inverted position when it may be necessary to do so. The benefit in inverting the trough is plainly seen; after using, it can be inverted to prevent the trough from freezing or filling with snow; also, in the hot sun it keeps its interior from checking.

Description of Drawing.

Figure I is a perspective view of trough in position, and embodies my invention.

Figure II, end view, showing the trough in an inverted position.

Figure III, end view, showing the trough in its position when in use.

Figure IIII shows the flattened journal C at the end of the trough.

General Description.

A, fig. I, is a trough, having the flattened journals C attached to each end. Said journals are shown in position in figs. II, and III, in detail drawing, the dotted lines showing the top of the supporting-posts B. The journals may be made of hard wood, or metal, as convenient. The journals are supported on the top of the posts B, which are set in the ground at each end of the trough. The top of the posts are cut square, to form a level bearing for the journals C to rest on. The pins $d\ d\ d$ hold the journals in position, and prevent them from sliding out of place. The trough is inverted by the hand-pin $e$, which is driven into the side of the trough near its end.

I claim as my invention—

The invertible trough A, said trough having the flattened journals C C on each end, substantially as and for the purpose hereinbefore set forth.

FRANCIS J. GOLDSMITH.

Witnesses:
 WILLIAM PETTINGELL,
 JOHN W. TYLER.